United States Patent Office 2,811,071
Patented Oct. 29, 1957

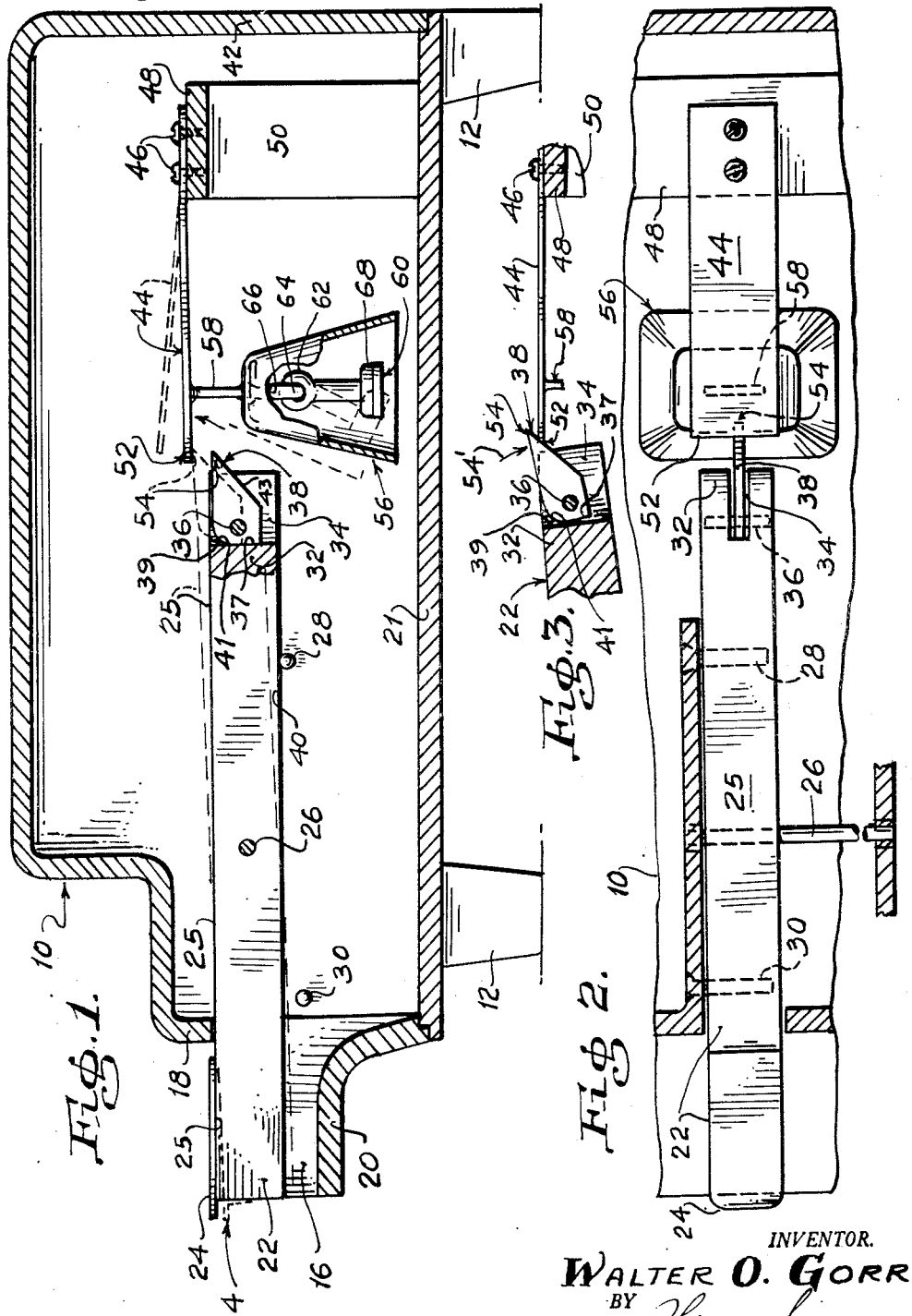

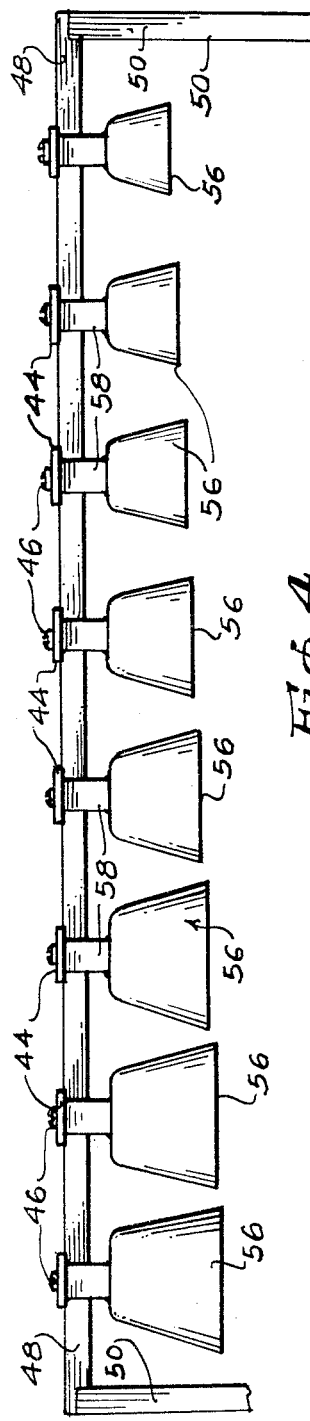
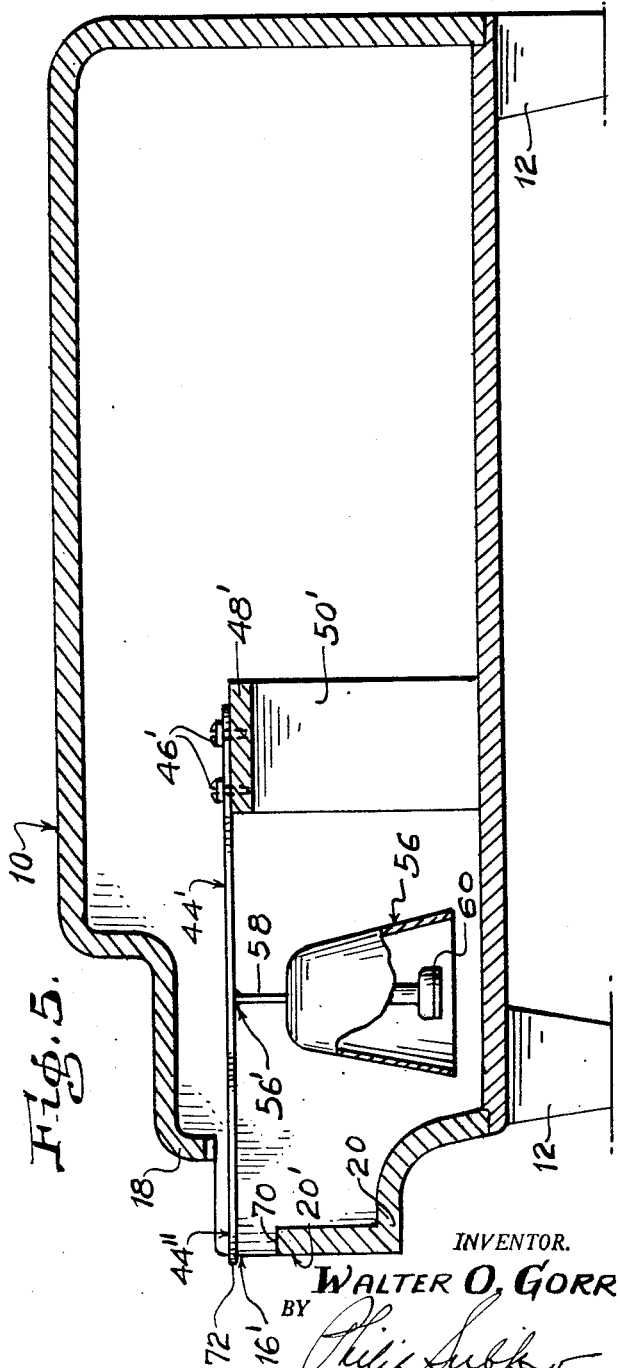

2,811,071

TOY MUSICAL INSTRUMENT

Walter O. Gorr, Glendale, Calif., assignor to Knickerbocker Plastic Co., Inc., North Hollywood, Calif., a corporation of California Application August 27, 1954, Serial No. 452,611

2 Claims. (Cl. 84—406)

This invention relates to a musical toy, and more particularly concerns a toy musical instrument particularly in the form of a toy piano, the musical notes or tones of which are produced by a series of tuned bells.

One object of this invention is the provision of a musical toy in the form of a piano, the successive notes of which are tuned to correspond to those of the ordinary musical scale.

Another object is to design a toy musical instrument in the form of a piano and comprising a series of tuned bells each producing a tone corresponding to a note of the musical scale.

Yet another object is to provide a toy bell piano comprising a series of tuned bells corresponding to the notes of a musical scale, each bell, on being set into oscillation or vibration, producing a series of successive tones of a given note, so that the instrument can be easily operated to produce tones, for example, chords, simulating the playing of a real piano.

A still further object is the provision of a toy piano of simple construction which is easily manufactured and is inexpensive.

The invention device is preferably housed in a case shaped like a piano, at the front of which is positioned a keyboard consisting of a series of keys adapted to be operated by pressing the fingers downwardly thereon, the keys simulating those of an ordinary piano.

In the interior of the piano and arranged in spaced apart relation to each other and in parallel alignment with the keyboard is a series of resiliently and separately mounted tuned bells each producing a tone of the musical scale, which may be either of the diatonic or chromatic type. The keys are connected by suitable means to each of the respective bells so that when a key is pressed the bell to which it is connected will be set into oscillation or vibration. This causes the bell clapper to strike the sides of the bell a number of times to produce a series of successive tones corresponding to a specific note for which that bell is tuned.

The bells are arranged in succession corresponding to the notes of a scale, each bell designed to produce one of such notes. The dimensions of the respective bells are varied to produce the desired pitch for each bell. When one or more of the keys are selectively pressed either successively or simultaneously, the corresponding bells are set into oscillation to produce multiple tones which may be the same or different, and which may simulate the chords of an ordinary piano.

The invention device is very simple in structure and can be readily manufactured, yet it enables even a child to pick out and play tunes so that they sound in effect like those produced by a real piano.

For a better understanding of my invention, below is described an embodiment of my device taken in connection with the accompanying drawings wherein:

Fig. 1 is a vertical cross section of a toy piano according to the invention partly broken away for clarity;

Fig. 2 is a plan view of a portion of the device shown in Fig. 1;

Fig. 3 is a detail of certain structural components shown in Fig. 1;

Fig. 4 is a front elevation of a series of tuned bells employed in the invention device; and Fig. 5 is a vertical cross section of a modification of the toy piano shown in Fig. 1.

Referring to Figs. 1 to 4, 10 represents a toy piano case shaped to generally simulate a piano, and comprising legs 12. The forward end 14 of the piano has an opening 16 therein, located between an upper depending flange 18 along the front of the piano just above the keyboard thereof, and an upwardly and outwardly extending flange 20 connected to the forward end of the bottom 21 of the piano.

Extending through the opening 16 along the front of the piano is a series of parallel bars 22, the bars being positioned closely adjacent to, but out of contact with each other transversely of the longitudinal axis of the piano, and extending substantially from one end to the other of the piano. Each of the bars 22 has a finger plate or key 24 connected to the upper surface 25 thereof at that end of the bars protruding beyond the flange 18. The juxtaposed finger plates 24 extending along the forward upper end of the piano constitute the keyboard thereof.

The bars 22 extend inwardly an appreciable distance into the interior of the piano case 10, and are pivoted intermediate their ends on pivot pin 26. Stops 28 and 30 are provided below bars 22 and intermediate their ends, to limit clockwise and counterclockwise rotation of bars 22 about their pivots 26. The inner end 32 of bars 22 each have a longitudinal slot 34, having positioned therein a contact member 38 mounted on a pivot pin 36. The bars 22 are usually maintained in a substantially horizontal position with the lower surface 40 thereof in contact with the inner stop 28, as seen in Fig. 1. In the normal position of contact member 38 shown in Fig. 1, it is seen that the inner edge 37 of member 38 is in continuous or camming engagement with the inner end wall 39 of slot 34 so that member 38 is unable to rotate clockwise. However, contact member 38 has a rounded upper shoulder 41 at its inner end, which enables contact member 38 to be pivoted counterclockwise, e. g., to the position shown in Fig. 3. Member 38 also has an upwardly inclined lower edge 43 for a purpose hereinafter noted.

Disposed a short distance above the upper surface 25 of bars 22 and extending toward the rear 42 of the piano is a series of flat springs 44, each of the springs being substantially in alignment with a bar 22. Springs 44 hence are positioned parallel to and spaced from each other along the length of the piano interiorly thereof, and coextensive in this respect with the bars 22. The rear end of each of the springs is connected by means of screws 46 to a plate 48 attached at its opposite ends by suitable means to vertical supports 50. Plate 48 extends longitudinally of the piano parallel to and spaced a short distance from the rear wall 42 of the piano. The forward edge 52 of the springs 44 extends slightly beyond the outer tip 54 of contact member 38 so that when bars 22 are pivoted counterclockwise about pivot pin 26, the tip 54 of contact members 38 will move upwardly to make contact with the lower end surface of the springs 44 adjacent edge 52, as seen in dotted lines in Fig. 1.

Suspended from each of springs 44 near the forward edge 52 thereof is a bell generally indicated by the numeral 56. These bells are shown as being wedge shaped, i. e., having trapezoidal sides of about the same slope. It will be obvious to those skilled in the art that other bell shapes can be employed. Bells 56 are each integrally connected at their upper ends to a supporting plate 58 in the form of a thin flat bar which is in turn attached at its upper end either integral with or by suitable means to the forward end of springs 44. Each of the bells 56 has a clapper 60, the upper end of which is in the form of a ring 62 which is received in an eye 64 at the lower end of a stem 66 connected at its upper end to the closed top of the bell. The clapper is thus swingingly mounted on the stem 66 of each bell and on vibration of the bell 56, the clapper 60 oscillates freely from its upper end with respect to the bell, permitting the hammer 68 at the lower end of the clapper to strike the sides of the bell to produce a tone.

Bells 56 are designed so that each bell when struck by its clapper 60 produces a given tone or note of the scale. The result is a recurrent sound of fine purity and of pleasing duration for each bell. Thus, each of the eight bells 56 shown in Fig. 4 produces a different and successive note of the scale, and when more than one bell is set in vibration simultaneously, the recurrent sounds from each bell are superimposed, e. g., to produce chords. In such case the bells become progressively smaller as the notes ascend the scale; for example, from F natural through the octave, e. g., F, G, A, B flat, C, D, E, and F.

From the foregoing, it will be seen that when the fingers are pressed down on one or more of the plates 24 at the upper ends of bars 22, the bar 22 in each case is pivoted counterclockwise and the tip 54 of contact member 38 is brought into contact with the adjacent end of an aligned spring 44, as shown in dotted lines in Fig. 1. As the tip 54 continues to move upward, the free end of the spring 44 is deflected upward to its dotted line position shown in Fig. 1 until the tip 54 clears the end of the spring, causing the latter to snap downward and oscillate. This motion of spring 44 causes the bell to oscillate or vibrate, and clapper 60 of the bell 56 attached to the spring to oscillate with respect to the bell, the hammer 68 of the clapper striking the sides of the bell a number of times to produce a series of notes of a given pitch until the vibration of the spring 44 is damped out by the inertia of the bell mass. Counterclockwise movement of bar 22 is limited by contact of the lower surface of the bar with stop 30, and after the bell has been set into vibration in the manner described above to produce the desired tones, removal of the finger from the plate 24 of each key permits the bar 22 to rotate clockwise in the direction indicated by arrow 54′ (Fig. 3) back to its original position in contact with stop 28, as shown in Fig. 1. As the bar 22 thus rotates back to its original position, contact member 38 clears the end 52 of the spring 44 by pivoting counterclockwise about pin 36 sufficiently for this purpose, as the lower inclined surface 43 of contact member 38 adjacent tip 54 lightly brushes the end 52 of the spring 44 during return clockwise movement of bar 22, as seen in Fig. 3.

In the simplified modification shown in Fig. 5, bars 22 and their contact members 38, shown in Fig. 1, are eliminated. According to the instant modification, flat springs 44′, similar to springs 44 of Figs. 1 to 3, are positioned parallel to each other transversely of the longitudinal axis of the piano 10, and are juxtaposed for approximately the length of the piano. The free ends of the springs extend into the space 16′ between the upper flange 18 and the lower protruding front end 20′ of the piano, the outwardly extending end portions 44″ of the springs constituting the keys of the piano. The opposite ends of springs 44′ are secured by means of screws 46′ to a plate 48′ secured at its ends to supporting blocks 50′, plate 48′ extending lengthwise of the piano adjacent the front end thereof. Bell 56 is suspended from a point 56′ about midway along each spring 44′, in the same manner as described above. In this modification, the upper edge 70 of the forward end 20′ of the piano acts as a stop limiting downward movement of the front ends 72 of the springs 44′ when the keys 44″ are pressed. Release of the key or front end portion 44″ of each spring 44′ causes the latter to snap upward, vibrating the bell attached thereto and setting the bell clapper 60 into oscillation to strike the bell and produce the desired tones. Damping of the springs is brought about by inertia of the bells, and such damping causes the bells to cease vibrating and producing tones after an interval of time.

If desired, means may be provided to produce sudden damping of the springs to cause a cessation of oscillation and operation of the bells within a shorter length of time than would ordinarily be the case.

The terms "longitudinal axis of the piano," "lengthwise of the piano," and "the length of the piano," as employed herein, are intended to refer to that dimension of the piano parallel to the keyboard thereof.

The case 10 of the piano may be constructed of any suitable material such as plastic or metal, preferably the former.

While I have described a particular embodiment of my invention for the purpose of illustration, it should be understood that various modifications and adaptations thereof may be made within the spirit of the invention as set forth in the appended claims.

I claim:

1. A toy piano which comprises a piano housing, a plurality of flat springs secured at one end on a support within said housing, said springs being parallel and spaced from each other, each of said springs extending transversely of said piano, a bell suspended from each of said springs for oscillation therewith, said bell including a freely swinging clapper, each of said bells being tuned to produce a specific musical tone, said bells producing a series of tones corresponding to a musical scale, a plurality of elongated parallel members each substantially in alignment with a separate one of said springs and extending transversely of said piano with one end positioned externally of said piano housing, said last mentioned ends of said members forming the keys of said piano, each of said elongated members being pivoted intermediate its ends, the other end of said elongated members being disposed closely adjacent the free ends of said springs, and contact members carried on said other end of each of said elongated members for contact with said springs on pivotal movement of said elongated members.

2. A toy piano which comprises a piano housing, a plurality of flat springs secured at one end on a support within said housing, said springs being parallel and spaced from each other, each of said springs extending transversely of said piano, a bell suspended from each of said springs for oscillation therewith, said bell including a freely swinging clapper, each of said bells being tuned to produce a specific musical tone, said bells producing a series of tones corresponding to a musical scale, a plurality of elongated parallel members each substantially in alignment with a separate one of said springs and extending transversely of said piano with one end positioned externally of said piano housing, said last mentioned ends of said members forming the keys of said piano, each of said elongated members being pivoted intermediate its ends, the other end of said elongated members being disposed closely adjacent the free ends of said springs, a longitudinal slot in said other end of each of said elongated members, and a contact member pivotally mounted in each of said slots for limited pivotal motion, the outer end of each of said contact members being adapted to touch the end of the adjacent spring for oscillation thereof on pivotal movement of said elongated members.

References Cited in the file of this patent

UNITED STATES PATENTS

| | | |
|---|---|---|
| 317,391 | Lomas | May 5, 1885 |
| 635,416 | Batdorf | Oct. 24, 1899 |
| 1,091,043 | Daab | Mar. 24, 1914 |
| 1,335,010 | Morris | Mar. 30, 1920 |
| 1,995,316 | Loar | Mar. 26, 1935 |
| 2,510,094 | Fleury | June 6, 1950 |
| 2,625,069 | Zimmerman | Jan. 13, 1953 |

FOREIGN PATENTS

| | | |
|---|---|---|
| 189,542 | Germany | Oct. 18, 1907 |
| 41,215 | Austria | Feb. 25, 1910 |